United States Patent Office 3,518,286
Patented June 30, 1970

3,518,286
ORGANOTIN N-CARBAMATES
Kailash Chandra Pande, Adrian, and Guenther Fritz Lengnick, Manitou Beach, Mich., assignors, by mesne assignments, to Stauffer-Wacker Silicone Corporation, a corporation of Delaware
No Drawing. Filed Dec. 27, 1965, Ser. No. 530,747
Int. Cl. C07f 7/22; B01j 11/06
U.S. Cl. 260—429.1
6 Claims

ABSTRACT OF THE DISCLOSURE

This invention relates to a novel class of tin compounds and to organopolysiloxane compositions incorporating such compounds. The organotin N-carbamates contain either one or two tin atoms interconnected to a hydrocarbon radical via an acyloxylated nitrogen atom. The said tin compounds find utility as curing agents for silicone elastomers.

---

The compounds herein were prepared with the object of providing an improved curing agent for silicone elastomers. In this connection, their most specific application has relation to organopolysiloxane compositions which, with the aid of the tin compound, are adapted to cure at temperatures ranging from about 20° to 40° C. Such compositions are commonly referred to in the art as room temperature curing or vulcanizing compositions and are used for example, in mold making and in the construction industry for caulking. They are commonly laid down as from a pot or tube in a liquid or plastic condition and subsequently harden in situ to a desired solid elastic state.

The tin compounds of the invention are characterized in that they comprise either one or two tin atoms interconnected to a hydrocarbon radical via an acyloxylated nitrogen atom:

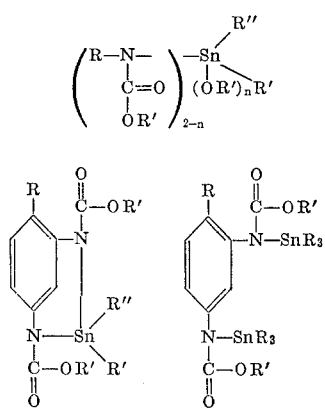

In these type formulae, R is a hydrocarbon group which may be halo-substituted e.g. alkyl, aryl, alkaryl, alkenyl, halo-alkyl, halo-aryl, etc.; R′ is an alkyl radical of from 1 to 15 carbon atoms, preferably 1 to 8 carbon atoms; R″ is such an alkyl radical or an aryl radical $n=0$ or 1.

The compounds herein are for the most part condensation products of alkyl and aryl isocyanates with trialkyl tin oxides or di- and tri-alkyl and aryl tin dialkoxides.

To illustrate the reaction using a dialkoxide:

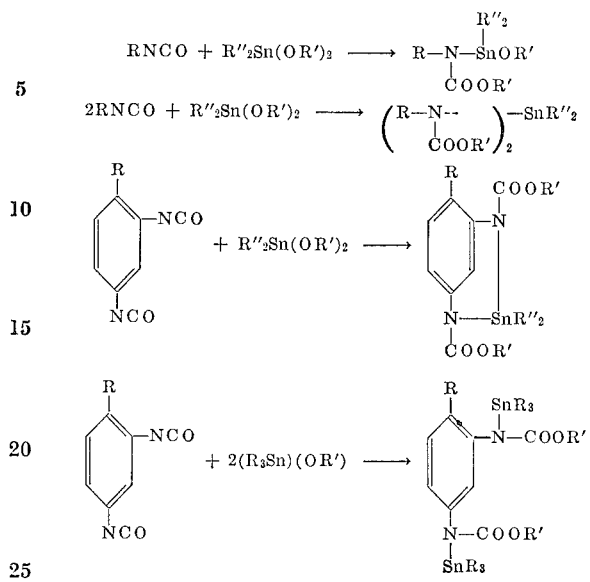

Such reactions are generally carried out in the presence of a common solvent such as benzene, toluene, heptane, pentane or the like. Although the reactions proceed at room temperature, higher temperatures can be used to increase the reaction rate. Anhydrous conditions should be maintained throughout the reaction.

The tin compounds of the invention as applied to catalyze room temperature curing of organopolysiloxane compositions are effective in minimal amounts e.g. 0.1 to 0.7 part by weight per 100 parts of the rubber composition. The tin compound may be added as such to the rubber material or, for convenience, it may be first incorporated in a carrier. Such carrier may be a comminuted solid or a liquid, or it may comprise both a solid component and a liquid component. As a component of the rubber material, the carrier is usually inert, but it may be functional. A typical carrier-catalyst formulation is a paste of the following composition:

| | Parts |
|---|---|
| Methyl end-blocked siloxant fluid (2,000 cps.) | 450 |
| Tin catalyst | 75 |
| Fumed silica (thickening agent) | 125 |
| Zinc oxide (for pigmentation) | 5 |

Such a paste, by attenuating the catalyst, facilitates the mixing operation at the work site and provides latitude in that it does away with the necessity of precise measurement. Using the particular paste, 4–5 parts thereof are ordinarily added per 100 parts of base composition.

The amount of catalyst or curing agent added to the base composition is determined by the requirements of the particular job, especially the pot life or working time required. In caulking, for example, the working time is more or less conventionally calculated as of the order of 2 to 2½ hours. Thus, in this instance the catalyst is added in an amount which will not result in any substantial stiffening of the silicone rubber until after expiration of such period of time. Normally, the rubber is tack-free within 4–6 hours following the caulking, is substantially cured after 24 hours and completely cured after 7 days. These periods, of course, vary somefhat with changes in humidity and temperature conditions. Thus, a faster results under conditions of high temperature and high humidity.

Exemplary base compositions to which the compounds herein have been added with excellent results are given below. The "OH Fluid" in each instance refers to an organopolysiloxane having functional hydroxyl groups attached to the terminal silicon atoms as illustrated by the formula:

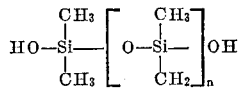

in which $n$ is an integer sufficient to yield a material having a viscosity of from about 1,700 to about 2,800 centipoises and a molecular weight of 6–8,000.

REPRESENTATIVE BASE COMPOSITIONS

I

|  | Parts |
| --- | --- |
| OH fluid (2,000–2,400 cps.) | 100 |
| Ethyl silicate (crosslinker) | 6 |
| Iron oxide (reinforcing agent) | 60–75 |

II

|  |  |
| --- | --- |
| OH fluid (2,500–2,900 cps.) | 100 |
| Ethyl silicate | 4 |
| Iron oxide | 75 |
| Hydrogenated castor oil (thixotropic agent) | 9 |

III

|  |  |
| --- | --- |
| OH fluid (2,000–2,400 cps.) | 100 |
| Ethyl silicate | 4 |
| 5 micron silica (reinforcing agent) | 65 |
| Zinc oxide (pigmenting and reinforcing agent) | 10 |

It is to be understood that the invention herein is not limited in use to hydroxy end-blocked organopolysiloxanes for it is applicable to any organosiloxane composition in which the organosiloxane is capable of polymerizing or condensing at a temperature of 20–40° C. to yield an elastomeric or neo-elastomeric substance. Silicone rubber room temperature vulcanizing stocks conform in general, to the formula $$XOR_2SiO_2(R_2SiO)_nSiR_2OX$$

where each R represents either a monovalent hydrocarbon radical such as alkyl, aryl, alkenyl, alkaryl, aralkyl or cycloalkyl, or a halogenated monovalent hydrocarbon radical as chloro-, bromo- or fluoroalkyl, aryl, or alkenyl, X is a hydrogen atom or any of R, preferably hydrogen, and $n$ is an integer of at least 50. The operative polymers vary from relatively low viscosity fluids to high polymeric gums soluble in organic solvents. These materials are primarily difunctional, but mono- and trifunctional components may be present in an amount minor in relation to the amount of difunctional units.

Organic radicals answering to R in the immediate preceding type formula include: methyl, ethyl, octadecyl, phenyl, diphenyl, anthracyl, tolyl, xylyl, ethylphenyl, methylnaphthyl, benzyl, phenylethyl, cyclopropyl, cyclobutyl, cyclohexenyl, vinyl, allyl and octadecenyl as well as halogen substituted derivatives of such radicals including chloromethyl, bromomethyl, fluoromethyl, perchloroethyl, chlorofluoroethyl bromophenyl, 3,3,3-trifluoropropyl, α, α,α,-trichlorotolyl, chlorobenzyl, chlorodifluorovinyl and chloroallyl.

The siloxane polymers can be homopolymers, such as hydroxy end-blocked dimethylsiloxane mentioned supra, or copolymers as hydroxy and alkoxy end-blocked dimethyl-phenylmethyl-siloxane copolymers or mixtures thereof.

Cross-linking agents applicable to compositions incorporating the catalyst of the invention are, in general, organosilicon compound having more than two functional groups and conforming to the general structural formula $R_mSiX_{4-m}$ where R has the same significance as in the formula $XOR_2SiO(R_2SiO)_nSiR_2OX$ appearing above, each X is a reactive group capable of condensation with the XO- substituents in the siloxane and $m$ has an average value of from 0 to 2. Likewise applicable, are the corresponding siloxanes.

As exemplary of specific cross-linking agents which may be used in the practice of the invention may be mentioned: (a) silanes such as triethoxysilane, methyl triethoxy silane and phenyl-tributoxysilane, (b) siloxanes such as dimethyl-tetraethoxydisiloxane and dimethyl-diphenyl hexaethoxytetrasiloxane, (c) organopolysiloxane resins containing monomethyl, dimethyl and monophenyl units, (d) organo-hydrogen-polysiloxanes of the formula

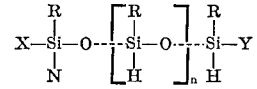

in which R is normally methyl or phenyl and X and Y are reactive groups as hydroxy or OSi(CH₃)₃ or the like. These latter compounds meet the requirement of polyfunctionality, since hydrogen is taken as a functional group.

The cross-linking agent may also be (e) a polyalkyl silicate (note ethyl silicate in the formulations supra) or (f) products derived from silicic acid and containing reactive groups, as hydroxy or alkoxy groups bound to silicon atoms. Silicic acid obtained by hydrolyzing trichlorosilane is applicable as is silicic acid esterified with an alcohol to form alkoxylated silicic acids.

The invention is further illustrated by the following examples which are not to be taken as in any way limitative thereof.

Example I 4.81 grams of phenylisocyanate (equivalent to 0.0403 mole) were dissolved in 20 ml. of toluene in a vessel adapted for the exclusion of moisture. An equimolar amount of dibutyltin dimethoxide was then added with stirring at room temperature over a 30 minute period. Some heat of reaction was observed. After overnight storage under anaerobic conditions the solvent was removed in vacuo leaving a viscous liquid, which had an infrared spectrum interpretable in accord with the structure,

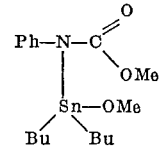

The characteristic vibrational spectrum of the —N-C-O group had disappeared.

Example II

The experiment of Example I was repeated except that dibutyltin dibutoxide was employed in lieu of dibutyltin dimethoxide. The product

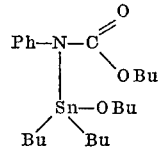

was found catalytically active in the room temperature vulcanization of a typical organopolysiloxane rubber base.

Example III

A one-liter, three-necked flask was fitted with a reflux condenser, addition funnel, thermometer and purge-lines for evacuation on nitrogen flushing. A magnetic stirring unit was utilized for agitation. The flask was charged with 56.0 grams of commercial toluenediisocyanate and 200 ml. of dry benzene. Dibutyltin dimethoxide in a 91.3 gram quantity, which was almost equimolar with the toluene diisocyanate, was dissolved in 55 ml. of benzene and added through the addition funnel. This addition of the tin-compound took about 1.25 hours during which a definite exotherm was noted. The solvent was subsequently removed at atmospheric pressure with heating, followed by vacuum removal of the last trace of volatiles. A solid formed which was proved by I.R. not to contain any N=C=O. Therefore, the following structure was assigned:

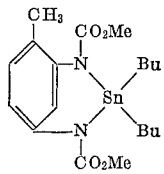

The I.R. results were supported by N.M.R.

Example IV

In a manner as described in the above examples $Bu_2Sn(OMe)_2$ was reacted with phenylisocyanate in a 1:2 molar ratio, yielding a compound,

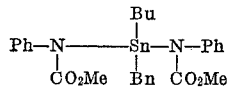

as shown by I.R. and N.M.R. spectra.

Example V

A hydroxy-end-blocked dimethyl polysiloxane fluid of 2,800 cs. viscosity was blended with an RTV (room temperature-vulcanizing) cross-linker, commonly known as Ethyl Silicate 40, in a weight ratio of 100 to 6. To this blend one gram of the compound

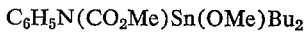

was added with vigorous agitation. The appearance of elastomeric properties was noted after about 15 minutes. The cured tack-free rubber was obtained after about 40 minutes. Volatile products evolved during the curing process had the aromatic odor of grapes. Heating of the cured rubber for several days at 180° F. did not produce the often-encountered harsh odor of conventional tin catalysts, the grape odor being retained.

Example VI

The procedure of Example V was repeated. In addition, 65 parts of acycular ferric oxide were added as a filler material to impart strength to the final cured rubber. Using the same catalyst in the same amount a composition was obtained having a working time of 2 hours. The final properties of the filled rubber were as follows: Tensile strength, 751 p.s.i.; elongation, 145%; tear strength, 31 pounds/in.; Shore A durometer hardness, 58.

Example VII

The procedure described in Example V was followed using the compound of Example III (0.5%) as catalyst. Again a good rubber with a favorable odor was obtained.

Example VIII

A formulation similar to that of Example V was catalyzed with the compound derived from the reaction of two moles of phenylisocyanate and one mole of dibutyltin dimethoxide (Example IV). The composition became essentially tack-free in about 30 minutes.

In certain of the examples mention is made of the grape-like odor of the volatiles evolved during curing of the rubber. This has greater significance than would appear. Thus, a major objection to present commercial silicone rubber catalysts goes to the strong offensive odor they emit on curing. Such odor is especially objectionable in close quarters. The volatiles giving rise to it are also corrosive of metals, a disadvantage overcome by the present invention.

What is claimed is:

1. An organotin compound characterized in that the same comprises a tin atom interconnected to a hydrocarbon group, which may be halo-substituted, via an acyloxylated nitrogen atom, said tin atom being directly connected to a pair of hydrocarbon radicals, the remaining valence thereof being satisfied by either an alkoxy group or a second acyloxylated nitrogen atom which may be linked to either said first-mentioned hydrocarbon group or a fourth hydrocarbon group similar to said first-mentioned group.

2. A compound conforming to claim 1 which meets the formula

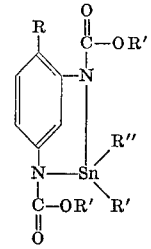

in which R is a hydrocarbon radical from the class consisting of alkyl, aryl, alkaryl and alkenyl radicals and the corresponding halo-substituted radicals, R' is an alkyl radical of from 1 to 15 carbon atoms and R'' is such an alkyl radical or aryl radical.

3.

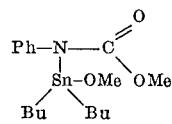

4.

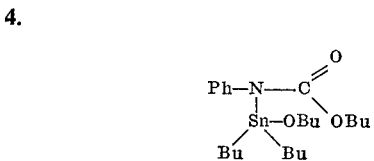

5.

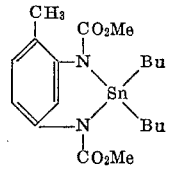

6.

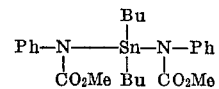

References Cited

UNITED STATES PATENTS 3,053,871  9/1962  Aries _____ 260—429.7 X
3,347,890  10/1967  Davies _____ 260—429.7

OTHER REFERENCES

Bloodworth, Chemical Society Proceedings (1963), p. 264.

TOBIAS E. LEVOW, Primary Examiner

W. F. W. BELLAMY, Assistant Examiner

U.S. Cl. X.R.

252—431

UNITED STATES PATENT OFFICE
CERTIFICATE OF CORRECTION

Patent No. 3,518,286                           June 30, 1970

Kailash Chandra Pande et al.

It is certified that error appears in the above identified patent and that said Letters Patent are hereby corrected as shown below:

Column 2, line 66, "somefhat" should read -- somewhat --.
Column 3, lines 4 to 7, the formula should appear as shown below:

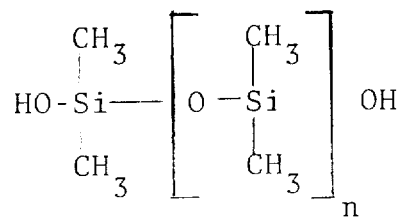

line 49, "immediate" should read -- immediately --. Column 4, lines 8 to 10, the formula should appear as shown below:

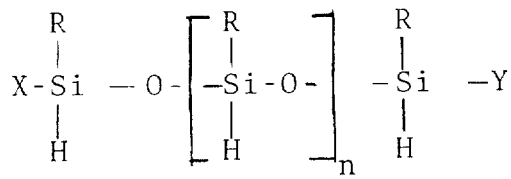

line 44, "-N-C-O" should read -- -N=C=O --. Column 5, lines 16 to 19, the formula should appear as shown below:

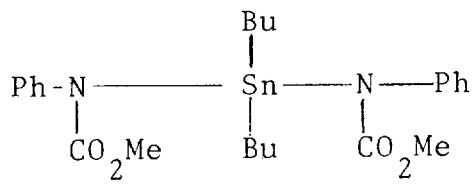

Signed and sealed this 23rd day of March 1971.

(SEAL)
Attest:

EDWARD M. FLETCHER, JR.                    WILLIAM E. SCHUYLER, JR.
Attesting Officer                               Commissioner of Patents